Nov. 11, 1924.

1,514,709

A. H. LYON

MILLING CUTTER

Filed May 15, 1922   2 Sheets-Sheet 1

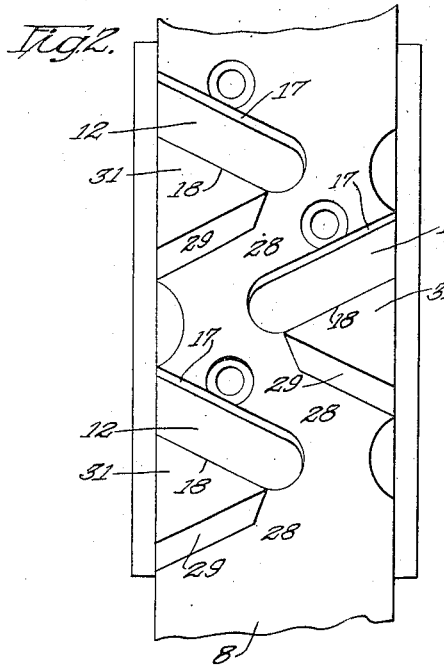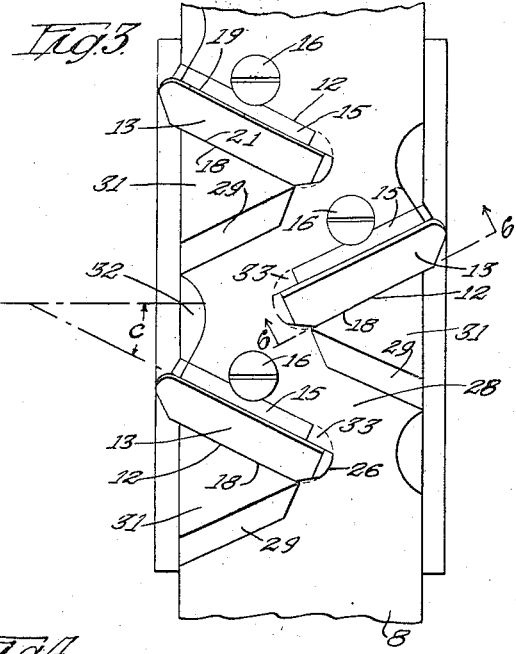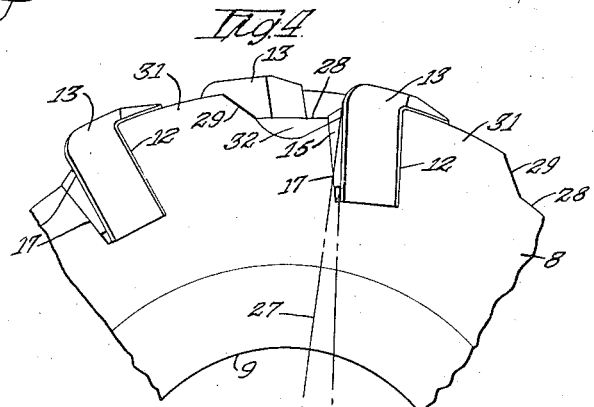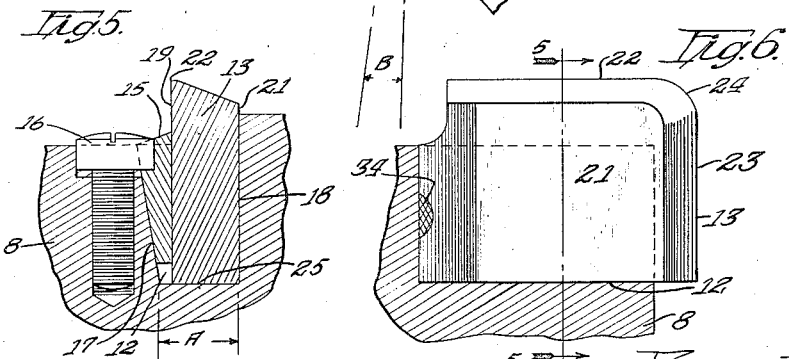

Patented Nov. 11, 1924.

1,514,709

UNITED STATES PATENT OFFICE.

ARTHUR H. LYON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MILLING CUTTER.

Application filed May 15, 1922. Serial No. 561,034.

*To all whom it may concern:*

Be it known that I, ARTHUR H. LYON, a citizen of the United States, residing at Rockford, in the county of Winnebago and State of Illinois, have invented certain new and useful Improvements in Milling Cutters, of which the following is a specification.

This invention relates to milling cutters of the inserted-tooth type, and has more particular reference to those especially adapted for cutting slots and channels. Heretofore, it has been the general practice in the manufacture of milling cutters of this type to insert the cutting blades in transverse slots in the mill body reaching from side to side thereof and to provide either wedge or screw devices for securing the blades in the slots. As a result of this construction, the peripheral portion of the mill body is weakened and the teeth are apt to become loosened and to shift.

The primary object of the present invention is to provide a new and improved inserted-tooth milling cutter particularly adapted for heavy duty channeling and slotting.

My invention provides a novel construction which promotes rigidity and potential strength and enables performance of extremely heavy and continuous-duty work to a high degree of efficiency. It provides for so mounting and securing the cutting blades in the mill body as not to impair the strength and durability of the cutter. My invention further enables heavy cuts to be made with minimum resistance to the chips, thereby promoting better cutting.

More particularly, I have aimed to provide a milling cutter of the character described in which tooth slots are cut in the mill body from the opposite sides in staggered overlapping relation and with radial and axial rake, and a cutting blade secured in each slot, preferably by means of a wedge. Inasmuch as the blade slots do not traverse the entire width of the mill body, the potential strength of the latter is not impaired and the blades will be very effectually backed against the cutting stresses by reason of their mounting in these slots. Another feature consists in milling intersecting transverse channels in zig-zag fashion in the periphery of the mill body so as to provide large clearance at the face of each tooth and a projecting body portion backing up the back of each tooth.

Still another object is to provide a milling cutter of the character described constructed in such simple and novel manner as to enable production at a comparatively low cost.

Other objects and attendant advantages will be appreciated by those skilled in this art as the invention becomes better understood by reference to the following description when considered in connection with the accompanying drawing, in which—

Figs. 2 and 3 are fragmentary face views showing the mill body with and without the cutter blades;

Fig. 4 is a fragmentary side view of the cutter;

Fig. 5 is a sectional view taken on the line 5—5 of Fig. 6; and

Fig. 6 is a sectional view taken on the line 6—6 of Fig. 3.

Figure 1:
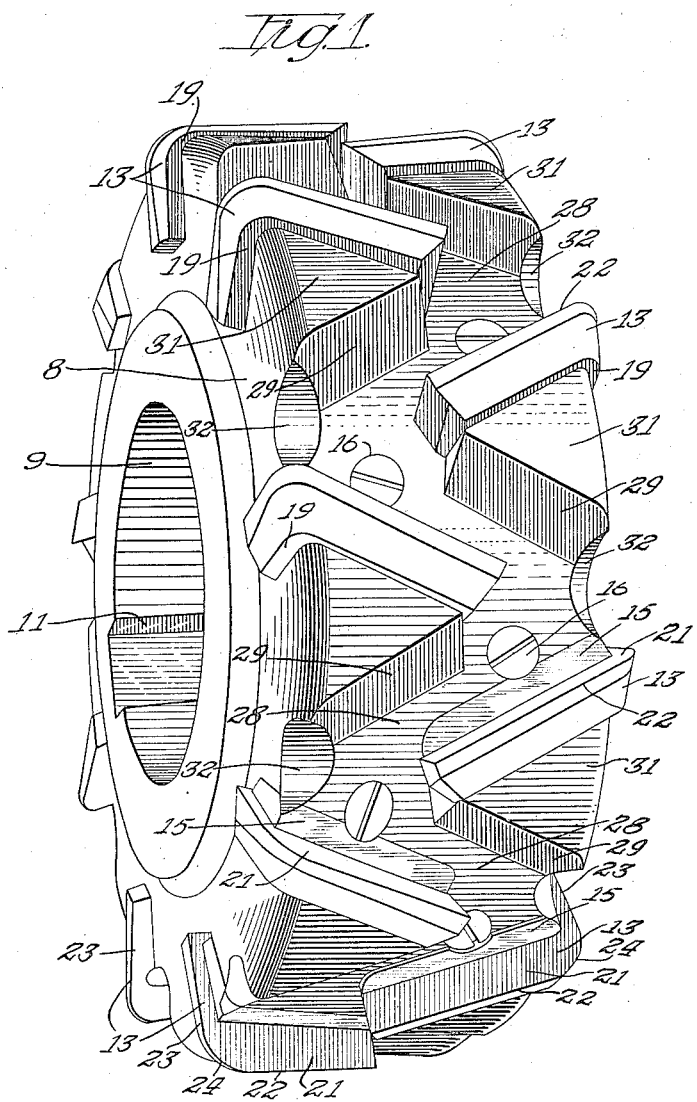
Figure 1 is a perspective of a milling cutter embodying my invention.

The mill body, designated generally by 8, may be of conventional cylindrical form having the usual bore 9 and key-way 11 for mounting, or it may be mounted in any other manner. Inasmuch as the cutter is especially designed for heavy-duty work, it is desired to maintain a small overall diameter in proportion to the diameter of the arbor in which the cutter is to be mounted, without sacrificing any advantages as to quality of the work and strength and durability of the cutter.

There is formed in the peripheral portion of the mill body at each side thereof, a series of circumferentially spaced slots 12 for the reception of the cutting blades 13, these numerals being generally applied. The slots at one side alternate with those at the other and terminate within the mill body in overlapping relation. This leaves a continuous circumferential mill body possessing much greater strength than those constructions in which the blade slots extend from side to side. Each slot is formed in such manner that its blade will have both radial and axial rake, as will be presently more fully described. I prefer to secure each blade in its slot by means of a wedge block 15 adapted to be drawn into wedging engagement by a cap screw 16.

Inasmuch as it is desirable to form the mill body from a block of steel, I prefer to cut the blade slots by means of an end mill. The end mill of a diameter equal to the base of the slot indicated by the dimension A (Fig. 5) will be fed into the body from one side in the requisite plane and to such depth as will be necessary for producing the desired slot. Said mill and the body 8 will then be relatively tilted to mill the front face 17. As a result of this milling operation, each slot will have a back face 18 disposed at an angle with respect to a radius and the cutter axis, which angle determines the radial and axial rake of the cutter blade. Each blade has parallel front and rear faces 19 and 21 respectively, and is ground to provide a peripheral cutting edge 22 and a side cutting edge 23 joined by a round corner 24. These cutting edges may obviously be shaped to suit the particular work at hand, and are provided with the necessary clearance. The corner cutting edge may be of any suitable shape. It will be manifest that each blade seats against the rear wall 18, the bottom wall 25 and the inner end wall 26 of its slot, and is firmly clamped and secured in such position by its wedge block 15. It will also be evident that each blade is so supported that its front face 22 is disposed at an angle with respect to the radius indicated by 27, shown in Fig. 4, thereby producing the radial rake designated by dimensions B (Fig. 4), and that said front face is disposed at an angle or spirally with respect to the axis of the cutter, as indicated by C (Fig. 3), which angle I term the axial rake.

The periphery of the mill body is formed preferably by a form cutter to provide additional clearance at the face of each blade and increased backing for the back thereof. This is done by milling a groove transversely across the periphery of the mill body, parallel with the longitudinal plane of each blade slot and overcutting the slot with one side of the groove co-planar with the back wall of said slot. This form cutter will have substantially flat peripheral cutting edges which cut the bottom 28 of the clearance slot, and inclined side edges which cut the inclined forward wall 29 of the slot. It will be manifest viewing Fig. 2, that the clearance slots at the front of each two adjoining blade slots intersect, thereby providing a zig-zag slot or channel extending circumferentially of the mill body and leaving projecting body portions 31 for backing up the cutter blades throughout substantially the length of the back thereof. As a result of this construction, each blade is backed by a solid wall extending substantially to its clearance edge, while the body portion at the face of the blade is cut away substantially below the backing 31, thereby giving ample clearance for the chips. Additional clearance is provided immediately in advance of the corner of each blade by cutting the mill body away as at 32. These clearance recesses allow the chips cut by the corner cutting edges to cut naturally without crowding or distortion.

It will be observed that each wedge block terminates short of the inner end of its slot, leaving an open space. This space will be filled by babbitt 33 which will be retained in position by filling a recess 34 in the inner end of the blade, as shown in Fig. 6. This babbitt is used simply to fill any opening, so that there will be no recesses or abrupt edges which might retard the chips.

The cutter shown herein being the preferred embodiment of my invention, is particularly adapted for milling channels of various depths, and is especially well suited for heavy-duty work, that is, for milling comparatively deep channels in steel bodies, such for example as in locomotive main and side rods. As a working illustration, assume that the cutter shown is 10 inches in diameter and that the width of the cutting face is 3¼ inches. This cutter at 22 R. P. M. will mill in a heat-treated chrome vanadium steel rod having approximately 90,000 pounds tensile strength, a channel 1½ inches deep at a feed of one-quarter inch per revolution, which gives approximately a lineal feed of 5½ inches per minute. It will be understood that these figures are merely illustrative of one working example. They do show, however, that the work performed is considerably greater than is possible with ordinary cutters. At the same time, it should be understood that this example is not merely a test case, but that the cutter may be used consistently in every day practice and will stand up under these conditions and will meet the desired requirements over a considerable period of time. In other words, the cutter has a comparatively great potential strength and is relatively long-lived when used for high power heavy-duty work. It should be understood that a cutter embodying the principles disclosed herein is not limited to channeling and slotting but may be used for other purposes, and if desired, the width of the face may be increased to such an extent as to require additional blades between the end or side blades. By reason of the staggered relation of the blades shown in the drawings, the end thrust will be equalized.

It is believed that the foregoing conveys to any one skilled in this art a clear understanding of the objects prefaced above, and while I have illustrated but a single working embodiment it should be understood that considerable change might be made in the design and details of construction without departing from the spirit and scope of the invention as expressed in the appended claims.

I claim:

1. A milling cutter comprising an integral body of revolution having a circumferentially continuous chip clearance groove leaving projecting blade backing portions, and cutting blades secured in the body and backed by each backing portion.

2. A milling cutter comprising a body of revolution having chip clearance grooves cut in its periphery leaving blade backing portions circumferentially spaced and alternating at both sides of the body, and a blade secured in the body in front of and backed by each backing portion, the blades at each side of the body being inclined spirally opposite from those at the other.

3. A milling cutter comprising a cylindrical body having circumferentially spaced blade slots cut in each side, reaching spirally toward the other side and terminating intermediate the sides, the slots at one side alternating with those at the other and being oppositely spirally inclined, chip clearance grooves cut in the periphery of the body parallel with and intersecting the top of the blade slots, leaving projecting blade backing portions, and a cutter blade secured in each slot against its backing portion.

4. A channel milling cutter comprising a body of revolution, a continuous zig-zag chip clearance groove in the peripheral portion of the body leaving intermediate projecting blade backing portions, blade slots in the body, one in front of and contiguous to each backing portion, and a cutting blade secured in each slot against its adjacent backing portion.

5. A milling cutter comprising a cylindrical body having in its peripheral portion a circumferentially continuous chip clearance groove formed by a plurality of transverse grooves reaching from side to side of the body in relatively angular, spirally disposed relation, and a cutting blade set into and secured in the body parallel with the major axis of each transverse groove.

6. A milling cutter comprising a body having a circumferentially contiguous peripheral chip clearance groove composed of relatively angular, spirally disposed grooves leaving intermediate projecting body portions each providing a blade backing wall, blade slots in the body, one extending inwardly from each groove toward the center of the body with its back wall co-planar with the blade backing wall of the adjacent projecting body portion, and a blade secured in each slot against its back wall.

7. A milling cutter comprising an integral cylindrical body having a contiguous chip clearance groove circumferentially thereabout formed by a succession of relatively angular, spirally disposed grooves leaving intermediate projecting body portions, blade slots in the body, one for each of said grooves, each blade slot being parallel with its respective clearance groove and disposed in front of and contiguous to the adjacent projecting body portion and axially over-reaching the adjacent slot, and a cutter blade secured in each slot with its back against the adjacent projecting body portion.

8. A channel milling cutter comprising an integral body of revolution having a peripheral continuous zig-zag chip clearance groove, a blade slot in the body parallel with and projecting radially inwardly from each angular groove portion, and a cutting blade secured in each blade slot.

9. A milling cutter comprising a cylindrical body having formed in its peripheral portion a continuous chip clearance groove composed of relatively angular, spirally disposed grooves leaving intermediate projecting body portions, each having a blade backing wall, blade slots in the body, one parallel with each of said grooves and having a back wall co-planar with the blade backing wall of the adjacent body projection and a front wall inclined with respect to a radial plane, a cutting blade in each slot with its back against the adjacent backing wall, a wedge in each slot between the inclined wall thereof and the blade, and means for tightening the wedge for clamping its blade in the slot.

10. A milling cutter comprising a body of revolution, spirally disposed chip clearance grooves in the peripheral portion of the body, the alternate grooves being parallel with respect to each other and angular with respect to the intermediate grooves so as to intersect the latter thereby providing continuous chip clearance in the body circumferentially thereof, and cutter blades secured in the body in axial overlapping relation, there being one blade for each chip groove, each blade extending parallel with its groove with its cutting face facing the groove.

11. A milling cutter as set forth in claim 10 in which the projecting body portions between the clearance grooves serve to back the cutting blades.

12. A milling cutter comprising a body having a plurality of circumferentially spaced blade slots in its peripheral portion, said slots having radial and axial rake, the alternate slots reaching axially from one side of the body and terminating within the sides thereof and the intermediate alternate slots reaching axially from the other side of the body and terminating within the sides thereof, the rake of the blade slots being such that the leading end of each slot is at the side of the body, a clearance groove in the periphery of the body extending from side to side and parallel with an overcutting each blade slot, the back wall of each clearance groove being coincident with the back wall of its respective blade slot, said clearance grooves each intersecting at its ends the adjacent clearance grooves thereby producing a continuous composite clearance groove around the body and leaving a projecting blade backing portion at the back of each blade slot, a blade in each slot, and means for securing each blade in its slot.

13. A channel milling cutter comprising a cylindrical integral body, chip clearance grooves cut in the periphery of the body reaching from side to side thereof, said grooves being spirally disposed and each alternate groove being parallel and inclined spirally in angular relation to the intermediate grooves and in such closely spaced relation as to intersect at each end the adjacent intermediate groove, thereby leaving a projecting body portion having a front blade backing wall, a blade slot cut in the body along each clearance groove, reaching from the outer side of the body to a point intermediate the sides thereof and contiguous to and parallel with the blade backing wall of the adjacent projecting body portion, a cutter blade in each slot with its back against the adjacent backing wall, and means for securing each blade in its slot.

ARTHUR H. LYON.